(12) United States Patent
Lin et al.

(10) Patent No.: US 6,723,942 B1
(45) Date of Patent: Apr. 20, 2004

(54) AUTOMATIC BREAKTHROUGH DETECTION DEVICE

(75) Inventors: Jui-Kuan Lin, Hsinchu (TW); Yung-Feng Nien, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/379,567

(22) Filed: Mar. 6, 2003

(51) Int. Cl.[7] .................. B23H 1/02; B23H 9/14; G01N 27/00
(52) U.S. Cl. ................ 219/69.17; 219/69.13; 219/69.16; 324/73.1
(58) Field of Search ............... 219/69.13, 69.16, 219/69.17; 324/73.1, 73.2

(56) References Cited

U.S. PATENT DOCUMENTS

| | | | |
|---|---|---|---|
| 4,146,770 A | * | 3/1979 | Dinsdale et al. ......... 219/69.17 |
| 4,484,051 A | | 11/1984 | Yamada et al. .......... 219/69.13 |
| 4,760,233 A | * | 7/1988 | Obara ..................... 219/69.16 |
| 4,767,903 A | | 8/1988 | Sciaroni .................. 219/69.17 |
| 5,496,984 A | * | 3/1996 | Goto et al. .............. 219/69.18 |
| 5,847,351 A | * | 12/1998 | Morita et al. ............ 219/69.16 |

* cited by examiner

*Primary Examiner*—Geoffrey S. Evans
(74) *Attorney, Agent, or Firm*—Rabin & Berdo, P.C.

(57) ABSTRACT

An automatic breakthrough detection device for drilling electric discharge machine is provided. The automatic breakthrough detection device utilizing the facts of the variations of high frequency spectrum components of the provided discharge voltage and the variation of servo-feed-rate of the electrode as drilling discharge. The device includes a high frequency spectrum detecting analyzer to produce digital logic determining signals and a breakthrough judging logic device to judge the breakthrough by the electrode on the workpiece. Accordingly, the drilling electric discharge machine automatically adjusts the discharge parameters and the electrode withdrawals from the drilled hole and continues the next drilling hole on the workpiece. The present invention also provides a method of the same.

10 Claims, 4 Drawing Sheets

AUTOMATIC BREAKTHROUGH DETECTION DEVICE

FIELD OF THE INVENTION

The present invention is generally related to a drilling electric discharge machine, and more particularly, to an automatic breakthrough detection device for drilling electric discharge machine.

DESCRIPTION OF RELATED ART

During the operation of a drilling electric discharge machine, an operator is required to observe the spraying effect from the drilling to determine if the process has finished and furthermore the operator is also required to manually adjust the machine table for the next drilling after every cycle. Recent computer numerically controlled (CNC) drilling electric discharge machines deploy a system for entering the drilling depth and the electrode wear compensation value before performing the drilling process. If any process variable deviations exist such as electrode discharge bias, water pressure fluctuation or deficiency, or water impurity, the electric discharge will become unsteady. Consequently the fluctuation in the electric discharge will increase the wear of the electrode and furthermore decrease the processing rate. If the electrode wear is too fast, the system might automatically terminate itself before drilling is finished. Occasionally if the electric discharge suddenly increases at breakthrough, the diameter of the hole will be affected causing non-linearity in the overall diameter.

Prior art U.S. Pat. No. 4,767,903 teaches the use of a conductivity measuring plate under a workpiece for detecting the breakthrough when the electrode makes contact with the conductivity measuring plate. This method however is limited to use only with workpiece that has a flat bottom surface and cannot be used on curved surfaces. Furthermore the conductivity measuring plate has only a limited life span. Another prior art U.S. Pat. No. 4,484,051 teaches a method by dividing the process factors into main factor such as servo voltage difference, and assisting factors such as water pressure, flow, electrode movement speed, and direction deviations to determine if drilling is finished. However this method requires a complicated system setup because the detection of pressure and process flow is not easy and the sensors for detection are expensive which are the shortcomings of this method.

The present invention solves the shortcoming of the above-mentioned conventional drilling electric discharge machines by reducing the process time and electrode wear. The automatic breakthrough detection device and method thereof for use with drilling electric discharge machine utilizes the facts of the variation of high frequency spectrum components of the provided discharge voltage and the variation of servo-feed-rate of the electrode.

SUMMARY OF THE INVENTION

An object of the present invention is to provide an automatic breakthrough detection device for use with drilling electric discharge machines and method thereof which is simple, provides real-time adjustment of process factors, and is applicable to any curved surfaces.

Another object of the present invention is to provide an automatic breakthrough detection device for use with drilling electric discharge machines and method thereof which reduces process time and electrode wear.

In one embodiment of the present invention, the automatic breakthrough detection device for use with drilling electric discharge machines comprises: a high frequency spectrum detecting analyzer and a breakthrough judging logic device. The high frequency spectrum detecting analyzer detects the variations of the high frequency spectrum components during the drilling electric discharge and processes the data to generate a digital logic determining signal which can determine whether breakthrough has occurred or not. The breakthrough judging logic device receives the digital logic determining signal sent out from the high frequency spectrum detecting analyzer to determine if the drilling breakthrough has occurred and sends out a result determining signal. The drilling electric discharge machine can automatically adjust the electric discharge parameter according to the result determining signal or automatically retract the electrode and move on to the next drilling process.

In another embodiment of the present invention, the high frequency spectrum detecting analyzer performs analysis on the resonance frequency of the discharge voltage after rectification and filtration to generate a digital logic determining signal which determines if the drilling breakthrough has occurred. The breakthrough judging logic device judges the digital logic determining signal to indicate the status of the drilling by comparing the feed rate and the actual downward movement of the electrode. The final result is determined after a few repetitions are performed for verification purposes. After confirming the completion of drilling, the breakthrough judging logic device sends out a signal to adjust the electric discharge parameter of the drilling electric discharge machine such as to decrease the amount of electric discharge to ensure steady electrode operation so as to end the drilling process. If there are other drilling processes required at the time, the machine will continue to perform the other drilling process.

BRIEF DESCRIPTION OF THE DRAWINGS

The invention can be more fully understood by reading the following detailed description of the preferred embodiments, with reference made to the accompanying drawings, wherein.

DETAILED DESCRIPTION OF THE PREFERRED EMBODIMENTS

Figure 1:
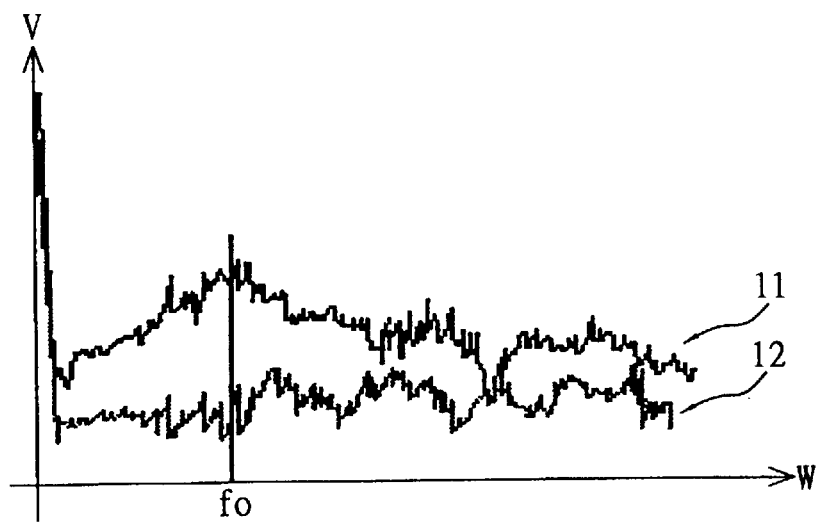
FIG. 1 shows a chart of voltage vs. frequency under normal electric discharge of the present invention.

During the drilling electric discharge process, the discharge voltage generates a high frequency spectrum. FIG. 1 shows the high frequency spectrum wave during normal electric discharge and breakthrough of the drilling electric discharge process. Reference numeral 11 represents the high frequency wave during normal drilling electric discharge and reference numeral 12 represents the high frequency wave of the drilling electric discharge after breakthrough. From the diagram, it is clearly shown that the resonance frequency of the drilling electric discharge machine is at f0, which represents the largest difference in the voltage between the normal drilling electric discharge and the drilling electric discharge after breakthrough. From the resonance point onwards, the voltage starts to drop rapidly and one can deduct from this phenomenon that the electrode has penetrated the workpiece. Furthermore the present invention combines the detection on the variation of servo-feed-rate to accurately determine if the electrode has in fact penetrated the workpiece.

Figure 2:
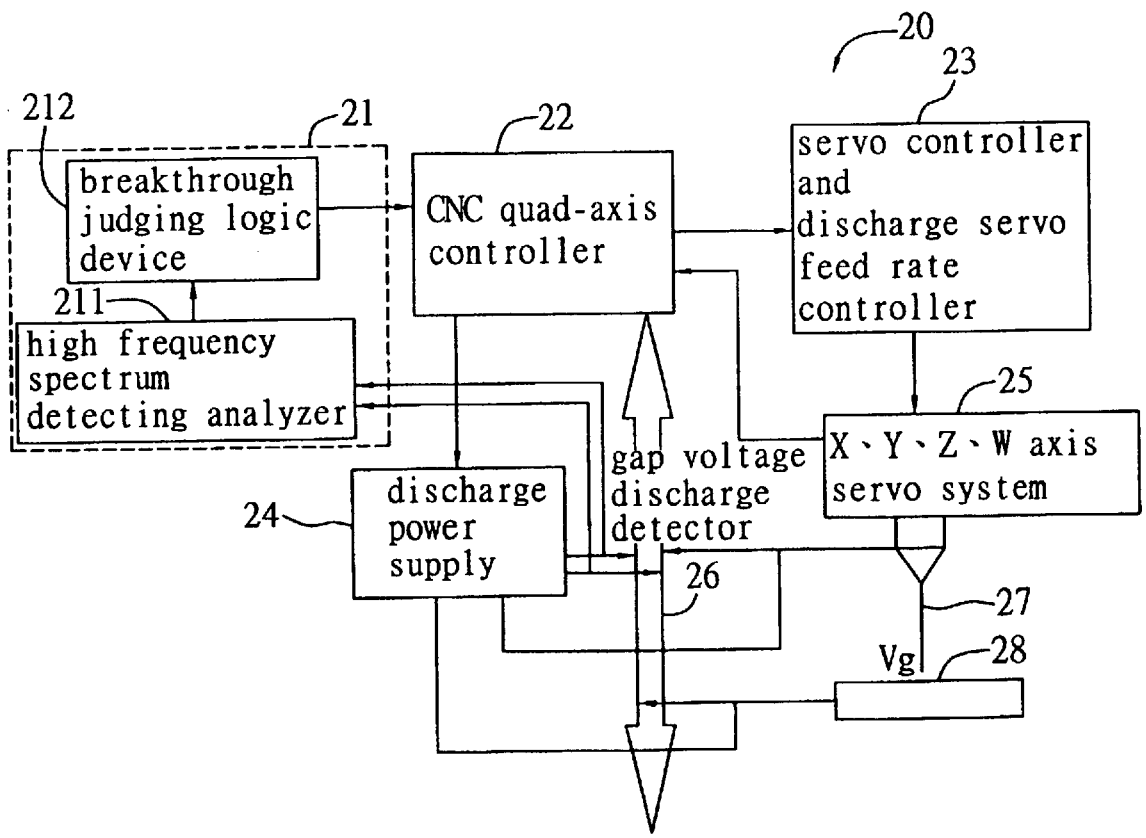
FIG. 2 shows a schematic diagram of the automatic breakthrough detection device for a drilling electric discharge machine of the present invention.

FIG. 2 shows the drilling electric discharge machine 20 with automatic breakthrough detection device of the present invention. The reference numeral 21 represents an automatic breakthrough detection device comprising a high frequency spectrum detecting analyzer 211 and a breakthrough judging logic device 212. During the drilling electric discharge process, the high frequency spectrum detecting analyzer 211 detects the variation in the high frequency spectrum components and processes the data to generate a digital logic determining signal which is sent to the breakthrough judging logic device 212 to determine whether drilling breakthrough has occurred (the detailed operation and process will be described below). A result determining signal is sent to the CNC quad-axis controller 22 of the drilling electric discharge machine 20 to facilitate automatic adjustment of the electric discharge parameter for continuous processing or termination of the current cycle to proceed to another drilling operation. The CNC quad-axis controller 22, the servo controller and feeder 23, the voltage source 24, the XYZ table 25, the electric discharge detector 26, the electrode 27, and the workpiece 28 are all commonly known equipment disclosed in prior art and therefore will not be discussed here.

Figure 3:
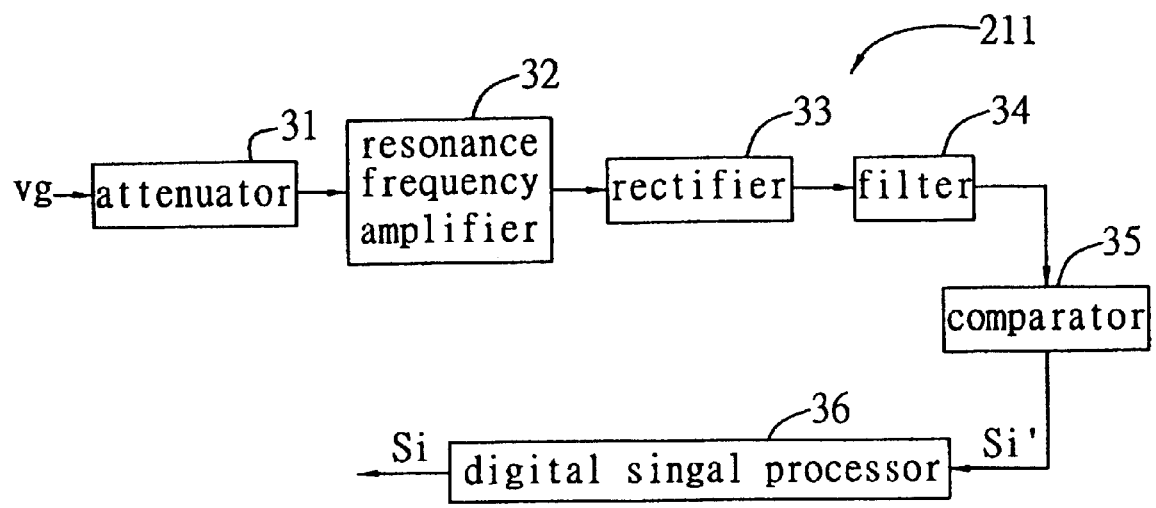
FIG. 3 shows a block diagram of the high frequency spectrum detecting analyzer of the automatic breakthrough detection device of the present invention.
Figure 4:
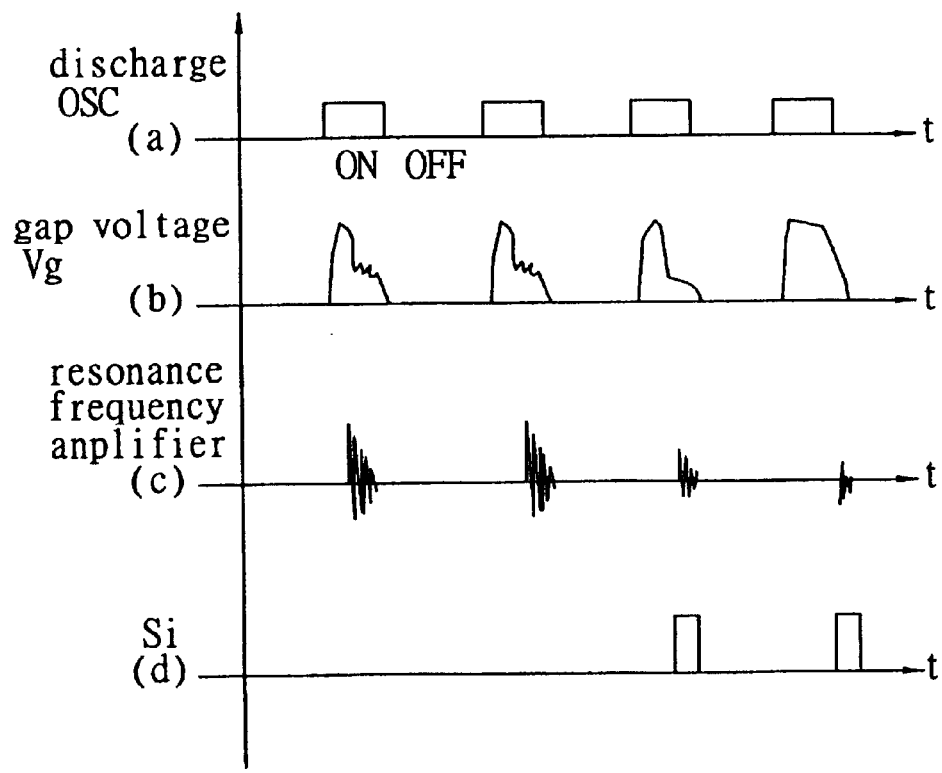
FIG. 4 shows timing diagrams of the waves of the high frequency spectrum detecting analyzer of the present invention.

Please refer to FIG. 3, it shows a block diagram of the high frequency spectrum detecting analyzer 211 in the automatic breakthrough detection device 21. Please refer to FIG. 4 simultaneously, FIG. 4 shows the diagrams of the waves of the high frequency spectrum detecting analyzer against time. During the discharge period (i.e. the segment 'ON' in part (a) of FIG. 4), the high frequency spectrum analyzer 211 receives the gap voltage Vg (i.e. part (b) of FIG. 4). The voltage attenuator 31 will lower the amplification to reduce the detected voltage and sends the lowered voltage to the resonance frequency amplifier 32 for extracting the resonance frequency voltage signal for amplification (i.e. part (c) in FIG. 4), at this moment the other frequencies need to be greatly attenuated. The amplified resonance frequency voltage is sent to the rectifier 33 and then to the filter 34 to obtain a positive voltage signal. The filtered positive voltage signal is compared to the reference voltage by the comparator 35 to generate a TTL-acceptable 5V voltage. For example, if the filtered voltage signal is greater than the reference voltage, the comparator 35 will output a high "H" Si' signal, and if the filtered voltage signal is less than the reference voltage, the comparator 35 will output a low "L" Si' signal. The Si' signal is then processed by a digital signal processor 36 to generate a digital logic determining signal which can identify if the drilling breakthrough has occurred or not (i.e. part (d) in FIG. 4).

From part (b) of FIG. 4, the first two curves read from left to right indicate the normal electric discharge during processing and the last two curves indicate the electric discharge during the pre and post breakthrough of the process respectively. Therefore part (d) of FIG. 4 shows that the Si' signal is "L" with a logic value of 0 during the normal electric discharge corresponding to the first two curves and the Si' signal is "H" with a logic value of 1 when breakthrough has occurred corresponding to the last two curves.

Figure 5:
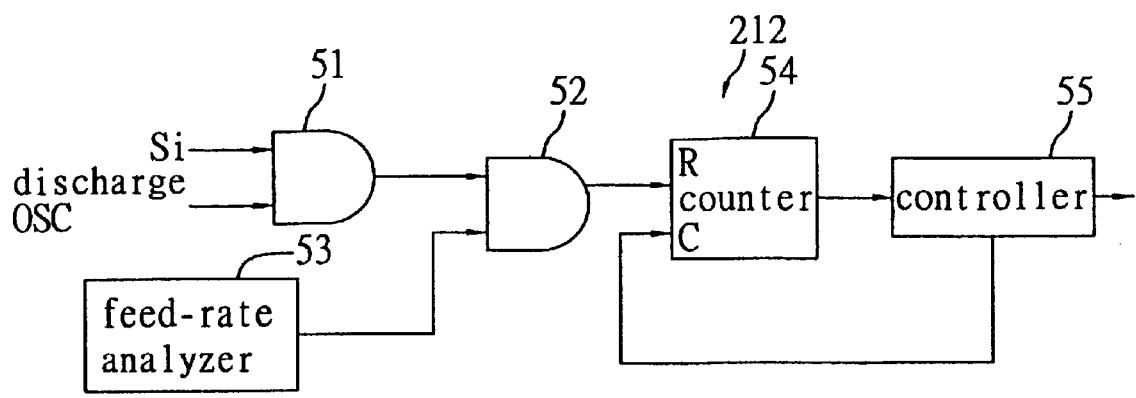
FIG. 5 shows a block diagram of the breakthrough judging logic device of the automatic breakthrough detection device of the present invention.

The automatic breakthrough detection device 21 of the present invention can precisely determine the breakthrough by use of a digital logic determining signal Si' which can identify whether breakthrough has occurred and furthermore complimented by the variation of the servo-feed-rate to confirm if breakthrough has in fact occurred. Due to the direct proportional relationship between the wear of the electrode and the depth of drilling, for a workpiece with a certain thickness a corresponding fixed amount of time of electric discharge can be calculated to complete the process. Therefore if the breakthrough signal is received with a predefined period of time, the breakthrough is then confirmed. At that point, the system automatically reduces the discharge voltage and adjusts the discharge parameter to allow the electrode to steadily proceed to subsequent operations. Oppositely, if the breakthrough signal is not received within the predefined period of time, it is determined that the process parameters are not suitable and therefore the system will increase the discharge parameter. Please refer to FIG. 5, it shows a block diagram of the breakthrough judging logic device 212 in the automatic breakthrough detection device 21. The first logic circuit 51 analyzes the result signals from the digital signal processor during the electric discharge to determine if breakthrough has occurred (i.e. whether the digital logic determining signal and the discharge oscillating signal show high and a logic value of "1"). If so the first logic circuit 51 outputs a logic "1", or else outputs a logic "0". The feed-rate analyzer 53 will analyze the feed-rate to determine the operation of the drilling process. For example, if the feed-rate analyzer 53 determines that the feed-rate should be less than 0, it indicates the electrode is moving downwards and the feed-rate analyzer 53 outputs a high logic "1" signal. Oppositely if the feed-rate analyzer 53 determines that the feed-rate should be greater than 0, it indicates the electrode is moving upwards or inert and the feed-rate analyzer outputs a low logic "0". At the same time, the second logic circuit 52 determines the output that indicates the breakthrough from the first logic circuit 51 and confirms it with the feed-rate analyzer 53 that indicates the status of the electrode is moving downwards and has made breakthrough (i.e. the input to both the first logic circuit 51 and the feed-rate analyzer 53 is high logic "1"). If the logic is "1" and the second logic circuit 52 is also "1", the test indicates that hole is in fact penetrated. A counter 54 keeps track of the number of times of successful breakthrough from the second logic circuit 52 and when it reaches a predefined number the counter 54 outputs a signal to the controller 55 to confirm the actual breakthrough. The controller 55 upon receive of the output from the counter 54 will send out an erase signal to the counter 54 to clear the value inside counter 54 and will send out a signal to the CNC quad-axis controller 22 of the drilling electric discharge machine 20 to proceed the next operation such as an adjustment of the discharge parameter to allow steady electrode processing. Furthermore if the controller 55 has not received any signal from the counter 54 over a predefined period of time to confirm the breakthrough signal, the controller 55 can send a signal to the drilling electric discharge 20 to override the discharge parameter to ensure smooth operation of drilling.

Figure 6:
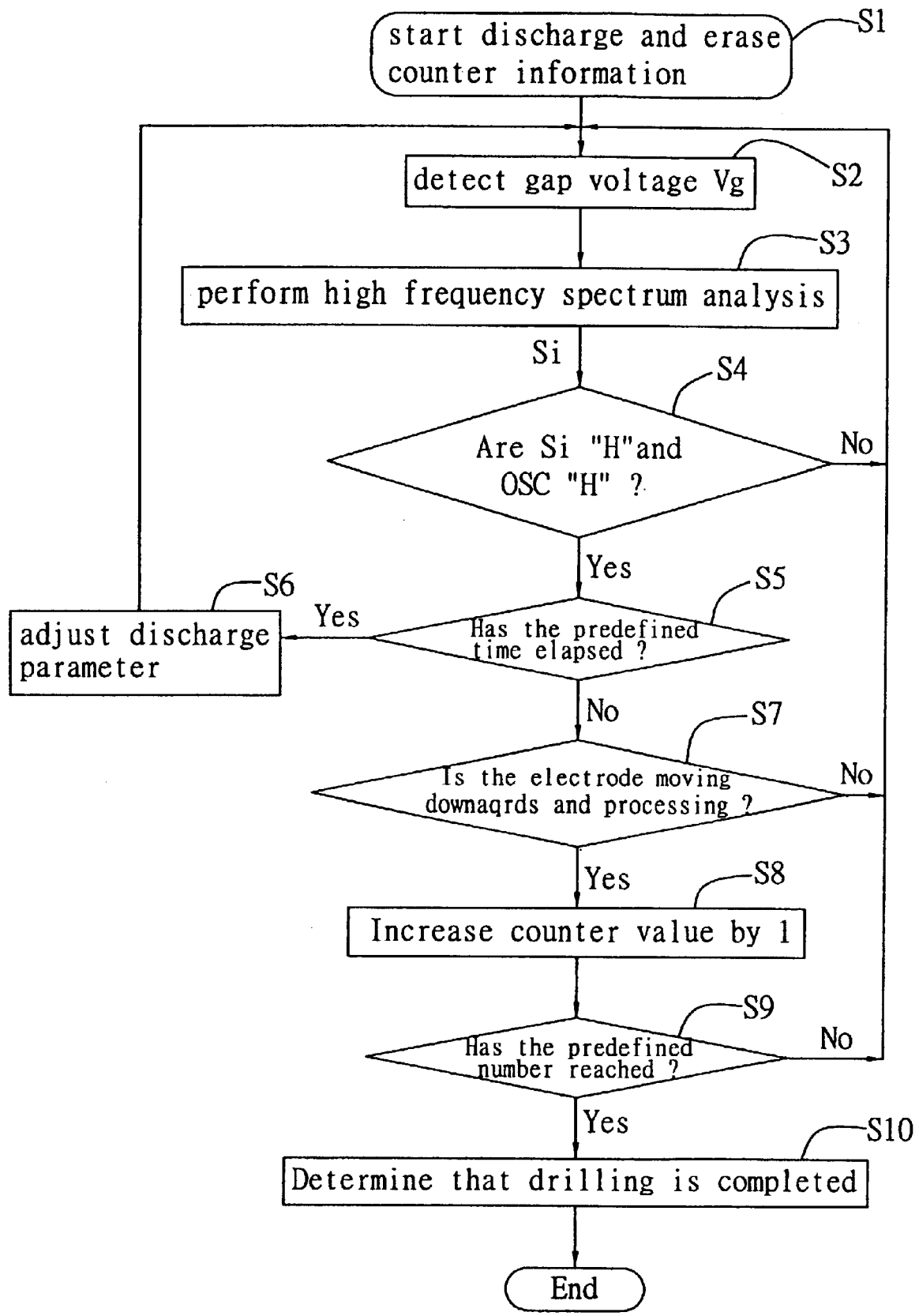
FIG. 6 shows the flow of the operation of the automatic breakthrough detection method of the present invention.

FIG. 6 shows a flow diagram of the breakthrough detection method according to one preferred embodiment of the present invention. In step S1, electric discharge starts and the information in the counter is cleared. In step S2, the gap voltage (Vg) is detected. In step S3, a high frequency spectrum analysis is performed on the gap voltage by processing the resonance frequency of the discharge voltage to obtain a digital logic determining signal which can determine if breakthrough has occurred or not. In step S4, analysis of the digital logic determining signal is performed to indicate if the breakthrough has occurred and whether the system is still undergoing electric discharge. If yes the system reverts to step S2, if no the system progresses to step S5. In step S5, it is determined if the predefined time has elapsed. If yes, the flow progresses to step S6 for adjusting the discharge parameter and then revert to step S2 after the adjustment is made to continue the flow; if no, the step progresses to step S7. In step S7, it is determined if the electrode is moving downwards making breakthrough according to the feed-rate of less than 0 that represents the electrode is moving downwards so the flow progresses to step S8. Oppositely if the feed-rate is determined to be greater than 0 which represents upward movement, the flow reverts to step S2. In step S8, the value of the counter is increased by 1. In step S9, it is determined if the predefined number has reached. If not the flow reverts to step S2, and if yes the flow progresses to step 10. In step 10, it is determined if drilling has made breakthrough.

In the method according to the above embodiment, the step S5 involving determining whether a predefined time has elapsed and step S6 involving adjusting the discharge parameter can be arranged anywhere in the flow between step S1 and S9. After step S10 involving determining the completion of drilling and breakthrough is completed, an adjustment of the discharge parameter can still be made to ensure steady electrode operation.

The present invention determines the variation of the high frequency spectrum components during the electric discharge and generates a digital logic determining signal by the high frequency spectrum detecting analyzer. The breakthrough judging logic device then determines if breakthrough has occurred to adjust the discharge parameter or to terminate the operation. The structure of the present invention is simple and allows real-time monitoring and adjustment of the process parameters. The present invention is applicable to any curve. The device and method of the present invention utilizes the relationship between a high frequency resonance frequency signal of the discharge voltage and a servo feed-rate to accurately determine the breakthrough and to provide control. The present invention accepts electrodes and workpiece made of different materials and can still perform breakthrough detection by using high frequency spectrum analysis. Therefore the device and method of the present invention are considered novel technology where the automatic breakthrough detection device of the drilling electric discharge machine can increase efficiency and decrease electrode wear.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An automatic breakthrough detection device for use with drilling electric discharge machines, comprising:

a high frequency spectrum detecting analyzer for detecting a variation of high frequency spectrum components and after processing for sending out a digital logic determining signal which determines a breakthrough; and a breakthrough judging logic device for receiving the digital logic determining signal from the high frequency spectrum detecting analyzer to determine if the breakthrough has occurred and to output a result signal;

whereby the drilling electric discharge machine is capable of being informed of the breakthrough or adjust a discharge parameter according to the result signal outputted by the breakthrough judging logic device.

2. The device in claim 1, wherein the high frequency spectrum detecting analyzer further comprising:

a voltage attenuator for lowering a detected discharge voltage;

a resonance frequency amplifier for amplifying a voltage of a resonance frequency of the lowered discharge voltage;

a rectifier for rectifying the amplified resonance discharge voltage;

a filter for filtering the rectified resonance discharge voltage;

a comparator for comparing the filtered resonance discharge voltage and a reference voltage to determine if the breakthrough has occurred; and a digital signal processor for processing a result signal from the comparator to generate the digital logic determining signal which determines if the breakthrough has occurred.

3. The device in claim 2, wherein the breakthrough judging logic device further comprising:

a first logic circuit for determining a result signal from the digital signal processor during an electric discharge process to indicate the breakthrough has occurred;

a feed-rate analyzer for determining a feed rate to indicate a current state of an operation;

a second logic circuit for confirming a breakthrough indication from the first logic circuit with the current state from the feed-rate analyzer;

a counter for counting a number of successful breakthroughs from the second logic circuit and once the number reaches a predefined number the counter outputs a signal;

a controller for receiving a count number from the counter, clearing the counter, and sending out a signal to the drilling electric discharge machine to proceed to next operation.

4. The device in claim 3, wherein the controller sends out a signal to the drilling electric discharge machine to adjust the discharge parameter if the controller does not receive a signal from the counter over a predefined period of time.

5. The device in claim 3, wherein the controller sends out a signal to adjust the discharge parameter to ensure steady electrode operation if the controller receives a signal from the counter within a predefined period of time.

6. The device in claim 3, wherein when the feed-rate analyzer determines a feed rate of less than 0, an electrode is moving downwards and the feed-rate analyzer outputs a high signal, when the feed-rate analyzer determines a feed rate of greater than 0, the feed-rate analyzer outputs a low signal.

7. An automatic breakthrough detection method, comprising:

(S1) starting electric discharge and erasing counter information;

(S2) detecting gap voltage (Vg);

(S3) performing high frequency spectrum analysis on the gap voltage and after processing generating a digital logic determining signal which determines if a breakthrough has occurred;

(S4) determining whether the digital logic determining signal that indicates breakthrough is within a timeframe of the drilling electric discharge process, if not revert to step (S2);

(S5) determining if a predefined time has elapsed, if not go to step (S7);

(S6) adjusting a discharge parameter and revert to step (S2);

(S7) determining if an electrode has made breakthrough, if not revert to step (S2);

(S8) increasing a value of a counter by 1;

(S9) determining if a predefined number is reached, if not revert to step (S2); and (S10) determining if a drilling operation is completed.

8. The method of claim 7, wherein step (S3) uses a resonance frequency signal obtained from the electric discharge to generate the digital logic determining signal which determines if the breakthrough has occurred.

9. The method of claim 7, wherein step (S10) further comprises adjusting the discharge parameter to ensure steady electrode operation.

10. The method of claim 7, wherein step (S5) and step (S6) are changeable in terms of an order in a flow anywhere between step (S1) and step (S9).

* * * * *